US00RE33900E

United States Patent [19]

Howson

[11] E Patent Number: Re. 33,900

[45] Reissued Date of Patent: Apr. 28, 1992

[54] ERROR MONITORING IN DIGITAL TRANSMISSION SYSTEMS

[75] Inventor: Robert D. Howson, Middletown, N.J.

[73] Assignee: AT&T Bell Laboratories, Murray Hill, N.J.

[21] Appl. No.: 387,725

[22] Filed: Jul. 31, 1989

Related U.S. Patent Documents

Reissue of:

[64] Patent No.: 4,397,020
Issued: Aug. 2, 1983
Appl. No.: 310,779
Filed: Oct. 13, 1981

U.S. Applications:

[63] Continuation of Ser. No. 186,402, Sep. 11, 1980, abandoned.

[51] Int. Cl.[5] ..... H04B 17/00; H04L 1/00; H04J 3/06

[52] U.S. Cl. ..... 370/105; 371/37.1; 371/37.7; 370/13; 370/105.1; 370/111; 375/108; 375/116

[58] Field of Search ..... 371/5.4, 37.1, 37.7, 371/42, 47.1, 61; 370/13, 99, 105, 105.1, 100.1, 102, 110.1, 111, 85.1; 375/106, 108, 114, 116, 119

[56] References Cited

U.S. PATENT DOCUMENTS

| | | | |
|---|---|---|---|
| 3,412,380 | 11/1968 | Heller et al. | 371/37.1 |
| 3,475,724 | 10/1969 | Townsend et al. | 371/37.9 |
| 3,873,920 | 3/1975 | Apple, Jr. et al. | 371/47.1 |
| 3,893,072 | 7/1975 | D'Antonio et al. | 371/35 |
| 4,012,719 | 3/1977 | Law et al. | 370/99 |
| 4,032,885 | 6/1977 | Roth | 375/116 |
| 4,125,725 | 11/1978 | Steidl | 370/105.1 |
| 4,142,070 | 2/1979 | Landauer et al. | 370/105 |
| 4,145,683 | 3/1979 | Brookhart | 371/42 |
| 4,154,948 | 5/1979 | Murasov | 370/105 |
| 4,158,193 | 6/1979 | D'Antonio | 371/5.4 |
| 4,168,400 | 9/1979 | de Couasnon et al. | 370/85.6 |
| 4,206,440 | 6/1980 | Doi et al. | 371/37.7 |
| 4,229,792 | 10/1980 | Jensen et al. | 375/108 |
| 4,238,852 | 12/1980 | Iga et al. | 371/37.7 |
| 4,306,305 | 12/1981 | Doi et al. | 371/37.7 |

OTHER PUBLICATIONS

"DS-1 Extended Framing Format", pp. 1-7; DS-1 Extended Framing Format USITA Meeting at AT&T Co., Basking Ridge, N.J., Apr. 16, 1980.

M. T. Manfred et al., "Digital Loop Carrier Systems", The Bell System Technical Journal, vol. 57, No. 4, Apr. 1978, pp. 1129-1156.

CCITT Recommendation X.25, "Interface Between Data Terminal Equipment (DTE) and Data Termination Equipment (DCE) for Terminals Operating in the Packet Mode on Public Data Networks", vol. VIII.-2—Rec.X.25, Geneva, 1976, pp. 70-76.

K. Kurahashi et al., "Speech Path System of Digital Transit Exchange", Electrical Communication Laboratories Technical Journal, vol. 28, No. 7, 1979, pp. 1261-1276, (Japanese).

K. Kurahashi et al., "DTS-1 Speech Path System", Review of the Electrical Communications Laboratories, vol. 27, Nos. 9-10, Sep.-Oct., 1979, pp. 728-738.

*Primary Examiner*—Benedict V. Safourek
*Attorney, Agent, or Firm*—Thomas Stafford

[57] ABSTRACT

Errors in digital transmission are monitored by employing a cyclical-redundancy-check (CRC). A CRC code word having a predetermined number of bits is generated (via 310) from a block of bits (ESF) of a presently transmitted time division multiplexed (XTDM) signal. The code word bits are then inserted (via 304, 305, 306) into predetermined bit positions of the next subsequent block of bits (ESF) of the XTDM signal. In a receiver (FIG. 7), bits of a presently received time division multiplexed (RTDM) signal are compared (801, 802) to bits of a CRC code word generated from the last previously received block of bits to indicate errors in transmission. In a specific example, a 6-bit CRC code word is employed and the code word bits are inserted into predetermined framing bit positions.

19 Claims, 5 Drawing Sheets

ERROR MONITORING IN DIGITAL TRANSMISSION SYSTEMS

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of my copending application, Ser. No. 186,402 filed Sept. 11, 1980 now abandoned.

Copending U.S. patent applications Ser. No. 186,404 and Ser. No. 186,403 were filed on Sept. 11, 1980, now U.S. Pat. Nos. 4,316,285 and 4,316,284 respectively.

TECHNICAL FIELD

The present invention relates to digital transmission systems and, more particularly, to monitoring of errors in the transmission of time division multiplexed signals.

BACKGROUND OF THE INVENTION

The basic time division multiplexed digital transmission unit is known as the DS1 signal. The basic DS1 signal format developed by a digital channel bank consists of 24 eight-bit words and one framing bit for a total of 193 bits per frame. The 24 words typically represent 24 separate and distinct messages deposited in 24 separate and distinct channels. The words are PCM (pulse code modulated) encoded and the least significant bit (i.e., eighth bit) of a channel is periodically dedicated for signaling purposes.

In some existing transmission systems the frames of the DS1 signal have been arranged into a so-called super frame comprising two groups of six frames each. Framing bits of the odd frames in the super frame are used to provide a pattern for per frame synchronization (1010 . . . pattern) and the framing bits of the even frames are used to provide a pattern for so-called subframe identification (111000111000. . . pattern). The subframe pattern identifies the sixth and twelfth frames of the super frame in which A and B signaling bits, respectively, are inserted in the least significant bit of each channel.

Prior systems employing the DS1 signal have used various techniques for monitoring transmission performance. To this end, measurements of error indications per unit of bits have been made and when prescribed limits are exceeded, alarms are enabled thereby alerting craftpersons that the system is malfunctioning. One error indication which has been used for alarming is the violation of the bipolar characteristic of the basic DS1 signal. A major problem with using a measure of bipolar violations is that the bipolar nature of the signal is lost in the digital transmission hierarchy. That is to say, when the DS1 signal is transmitted over a transmission system higher in the transmission hierarchy, e.g., T2 or T4M, the bipolar nature of the signal is converted to unipolar and a parity check is employed to monitor performance. Consequently, the use of bipolar violations is restricted only to systems transmitting over T1 carrier repeater lines. Therefore, end-to-end performance monitoring is not possible by monitoring bipolar violations when the signal is transmitted over a system which employs unipolar transmission.

In other applications framing errors are measured and employed to monitor transmission performance. A problem with the use of framing errors is that the framing bits occur relatively infrequently and, consequently, error measurement intervals are substantially longer than those attainable when using bipolar violations.

SUMMARY OF THE INVENTION

The problem of performance monitoring of digital transmission is overcome, in accordance with an aspect of the invention, by employing a digital code word having a predetermined number of bits which is generated in accordance with a prescribed criterion from bits of a time division multiplexed signal. The code word bits are inserted into predetermined bit positions of a time division multiplexed signal. In a receiver, bits of a received time division multiplexed signal are compared with bits of a code word generated from bits of a received time division multiplexed signal ostensively corresponding to the bits from which the bits of the code word in the presently received time division multiplexed signal were generated to indicate the presence of errors in transmission.

More specifically, the bits of a code word are generated in accordance with the prescribed criterion from a prescribed "block" including a predetermined number of bits of a time division multiplexed signal being transmitted. The code word bits are then inserted into predetermined bit positions of a subsequent block of bits of the time division multiplexed signal being transmitted. In the receiver, bits of a code word are generated from a block of bits of the received time division multiplexed signal and compared with bits of the next subsequent received block of bits to indicate the presence of errors in transmission.

In a specific example, the code word bits are inserted in predetermined framing bit positions of the time division multiplexed signal.

In a preferred embodiment of the invention, a transmit circuit includes a generator responsive to timing signals and the block of bits of the time division multiplexed signal presently being transmitted for generating a cyclical-redundancy-check (CRC) code word having a predetermined number of bits which are to be inserted into predetermined framing bit positions of the next subsequent block of bits of the time division multiplexed signal. A receive circuit includes a generator responsive to timing signals and the bits of the time division multiplexed signal being received for generating bits of a CRC code word which are to be compared to the bits of the next subsequent received block of bits ostensively corresponding to the transmitted CRC code word to generate indications of errors in transmission. That is to say, the bits of a CRC code word presently being transmitted in a block of bits were generated from the previously transmitted block of bits of the time division multiplexed signal and the bits of a presently received block of bits are compared to bits of a CRC code word generated from the bits of a previously received block of bits of a time division multiplexed signal for generating indications of errors in transmission. The error indications are employed as desired, for example, in accordance with prescribed criteria to enable so-called major and minor alarms.

In an exemplary embodiment of the invention a six-bit CRC code word is employed wherein the code word bits are inserted into predetermined framing bit positions in the time division multiplexed signal.

BRIEF DESCRIPTION OF THE DRAWING

The invention will be more fully understood from the following detailed description of an illustrative embodiment thereof taken in connection with the appended figures, in which.

DETAILED DESCRIPTION

Figure 1:
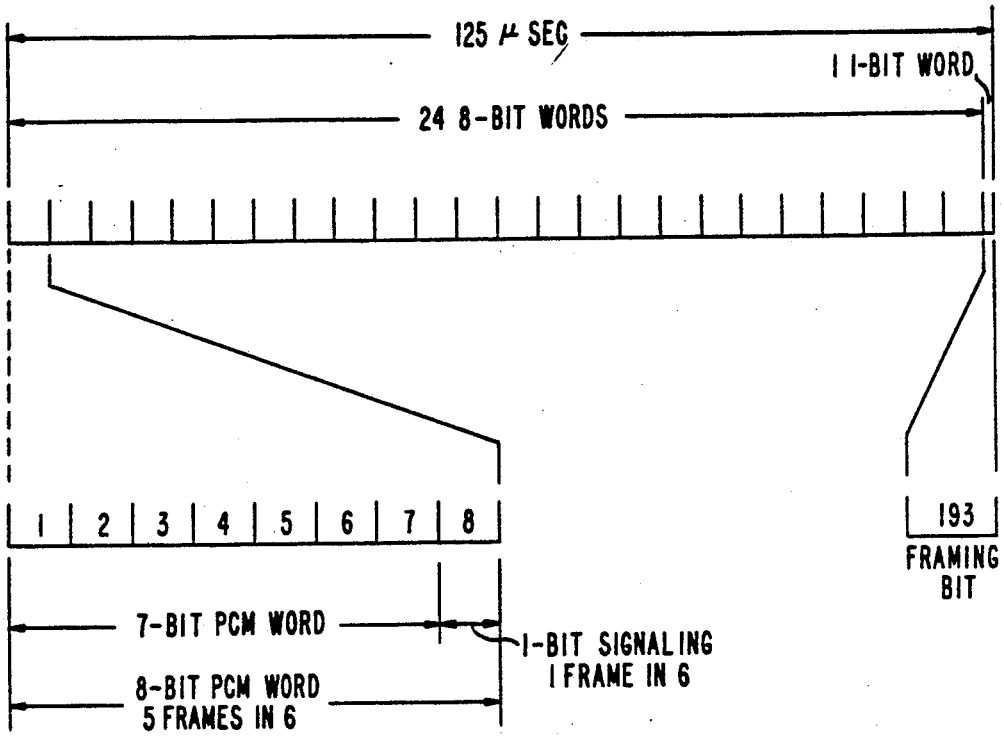
FIG. 1 illustrates the format of the basic DS1 digital signal.

To facilitate a clear comprehension of the present invention, yet at the risk of redundancy, the aforementioned DS1 signal will be considered in greater detail at the point. As illustrated in FIG. 1, all eight bits of a channel are used for carrying message information in five of every six frames, and the eighth bit (D8) is borrowed for signaling purposes in every sixth frame. Each signaling bit of each channel relates only to the signaling information for that particular channel; and, all of the signaling bits of a digital group occur in the same (one-to-six) signaling frame. Framing information is transmitted in the 193rd bit position of each frame. (The framing bit position may equally be considered the first bit of each frame, i.e., the 0 bit position). In more recent systems, the DS1 signal has been grouped into a so-called super frame comprising two groups of six frames each with the sixth frame having A signaling bits and the twelfth frame having B signaling bits. The per frame (1010. . .) pattern appears in every other frame, namely-1—X—0—X—1—X—0—. The frames which do not carry per frame framing bits are called signaling subframes and are used to send signaling framing information. The subframe pattern (111000)—1—X—1—X—1—X—0—X—0—X— 0 is employed to identify the sixth and twelfth frames.

The DS1 signal has served us well and the present invention may equally be utilized with that digital signal format as well as other and different digital formats.

However, in practicing the present invention it is contemplated that a so-called extended digital format is to be utilized including 24 frames in four groups of six frames each hereinafter referred to as an extended super frame (ESF). Moreover, predetermined bits in the format, in this example, bit positions previously employed for either per frame (Ft) framing bits or subframe (Fs) framing bits are utilized to realize an additional data link and for use, in accordance with an aspect of the invention, to transmit a cyclical-redundancy-check (CRC) code word to be used in monitoring transmission performance. Since four groups of six frames each are employed, four signaling bits are available, namely, A,B,C and D. In this particular example not to be considered as limiting the scope of the invention the eight kilobit framing bit channel is distributed into a four kilobit facility data link, two kilobit CRC performance monitoring channel and two kilobit channel for framing. A summary of the extended format is shown in the following table:

TABLE I

| | Extended Super Frame (ESF) | | | | | |
|---|---|---|---|---|---|---|
| | F-Bits | | | Bit number(s) in each time slot | | |
| Frame Number | F | Data | Error Detection | for Information | for Signaling | Signaling Channel |
| 1 | — | M1 | — | 1-8 | | |
| 2 | — | — | C1 | 1-8 | | |
| 3 | — | M2 | — | 1-8 | | |
| 4 | 0 | — | — | 1-8 | | |
| 5 | — | M3 | — | 1-8 | | |
| 6 | — | — | C2 | 1-7 | 8 | A |
| 7 | — | M4 | — | 1-8 | | |
| 8 | 0 | — | — | 1-8 | | |
| 9 | — | M5 | — | 1-8 | | |
| 10 | — | — | C3 | 1-8 | | |
| 11 | — | M6 | — | 1-8 | | |
| 12 | 1 | — | — | 1-7 | 8 | B |
| 13 | — | M7 | — | 1-8 | | |
| 14 | — | — | C4 | 1-8 | | |
| 15 | — | M8 | — | 1-8 | | |
| 16 | 1 | — | — | 1-8 | | |
| 17 | — | M9 | — | 1-8 | | |
| 18 | — | — | C5 | 1-7 | 8 | C |
| 19 | — | M10 | — | 1-8 | | |
| 20 | 1 | — | — | 1-8 | | |
| 21 | — | M11 | — | 1-8 | | |
| 22 | — | — | C6 | 1-8 | | |
| 23 | — | M12 | — | 1-8 | | |
| 24 | 0 | — | — | 1-7 | 8 | D |

Figure 2:
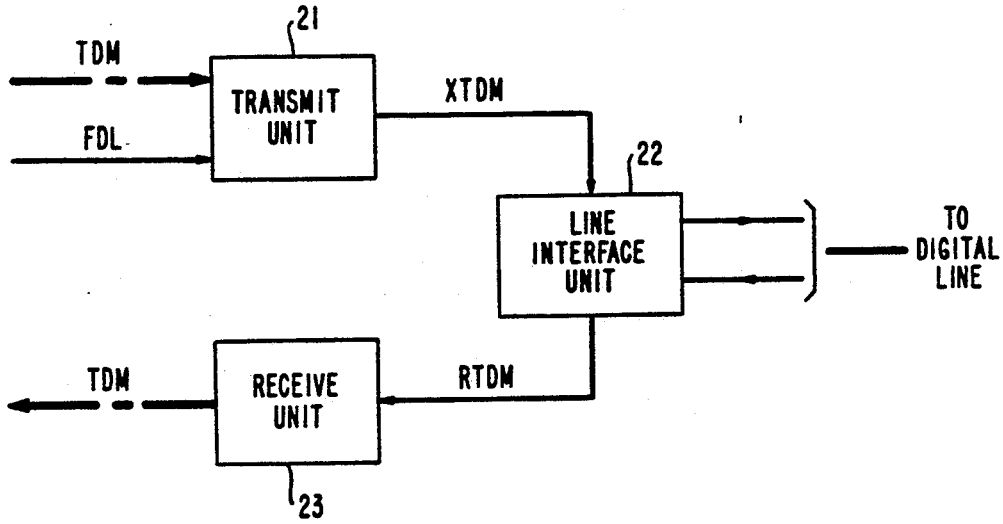
FIG. 2 is a simplified block diagram of a portion of a digital terminal incorporating apparatus in accordance with the invention.

FIG. 2 shows in simplified form a typical digital terminal which includes performance monitoring equipment in accordance with an aspect of the invention. Transmit unit 21 is supplied with time division multiplex (TDM) input data and facility data link (FDL) data, and generates a time division multiplex (XTDM) output signal to be transmitted over a digital transmission line. XTDM includes the requisite framing bits and, in accordance with an aspect of the invention, bits of a CRC code word for monitoring transmission performance. The composite multiplexed signal (XTDM) from transmit unit 21 is coupled to the digital line (e.g., a T1 transmission line) via line interface unit 22. Interface unit 22 typically converts the unipolar XTDM to bipolar for transmission over the digital line. In the receiving direction, the converse of the above-described operations is carried out. The incoming time division multiplexed (RTDM) signal is coupled from the digital line to receive unit 23 via interface unit 22. Receive unit 23 is employed to extract the data link (FDL) information from RTDM, operate on RTDM to extract the individual channel information and, in accordance with an aspect of the invention, generate error indications by comparing the CRC bits received in RTDM with CRC bits generated in receive unit 23. It is apparent that in a transmission system similar terminals are used at both ends of the digital line.

The foregoing, admittedly brief, description of time division multiplex transmit and receive units should provide an adequate background to facilitate an understanding of the present invention. Time division multiplex transmit and receive units have been in use since the early 1960's and have been extensively described in the literature—see for example, "D2 Channel Bank: Digital Functions" by A. J. Cirillo, et al., Bell System Technical Journal, Volume 51, October 1972; "The D3 Channel Bank" by W. B. Gaunt, et al., Bell Laboratories Record, August 1972, pages 229–233; "D4; Up-to-Date Channel Bank for Digital Transmission Plant" by W. G. Albert, et [a.] *al.*, Bell Laboratories Record, March 1977, pages 68–72; and also U.S. Pat. No. 4,125,745 issued Nov. 14, 1978.

Figure 3:
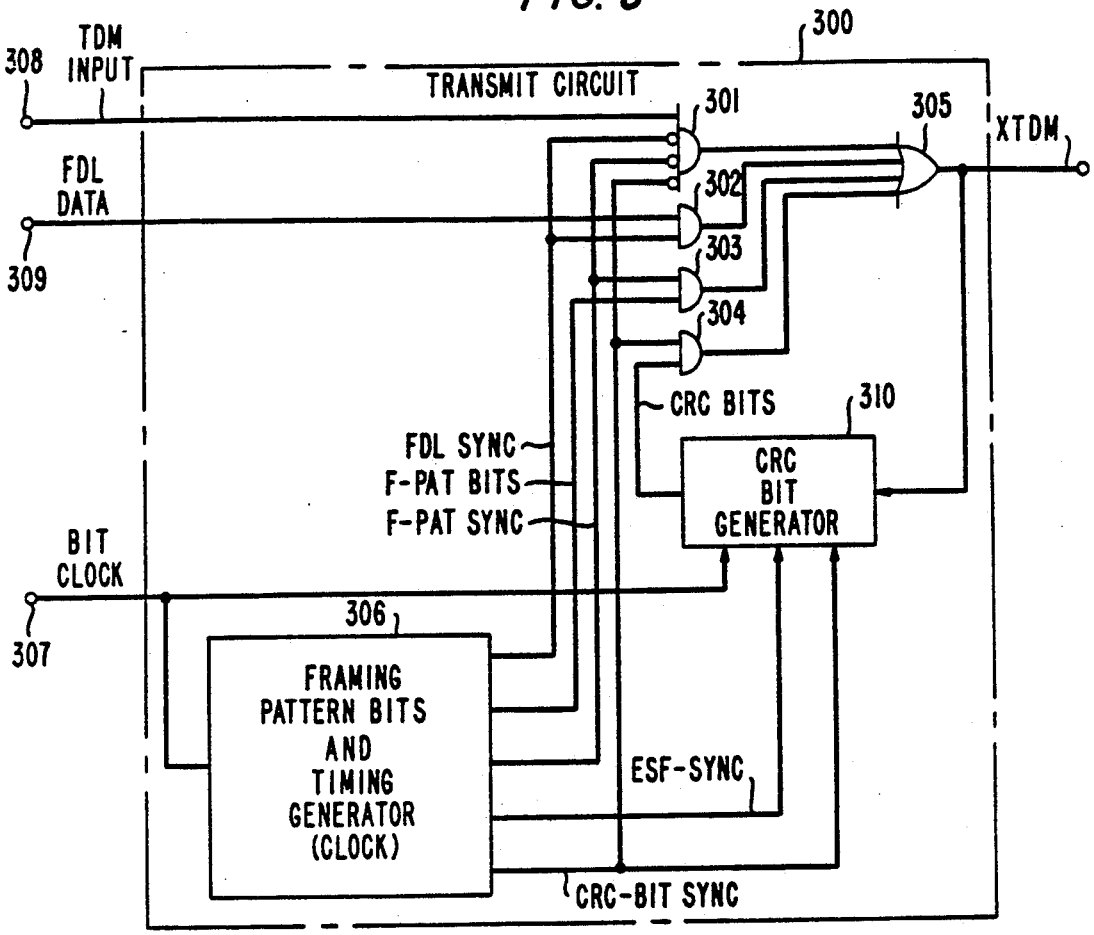
FIG. 3 shows in simplified form details of a transmit circuit included in the transmit unit of FIG. 2.

FIG. 3 shows in simplified form details of transmit circuit 300 employed in transmit unit 21 for formating a time division multiplexed (TDM) input signal into the desired time division multiplexed signal to be transmitted (XTDM). To this end, AND gates 301, 302, 303 and 304 in conjunction with OR gate 305 are employed to interleave TDM input data signal, FDL data, F-Pat Bits and CRC bits into time division multiplexed signal XTDM to be transmitted.

Figure 4:
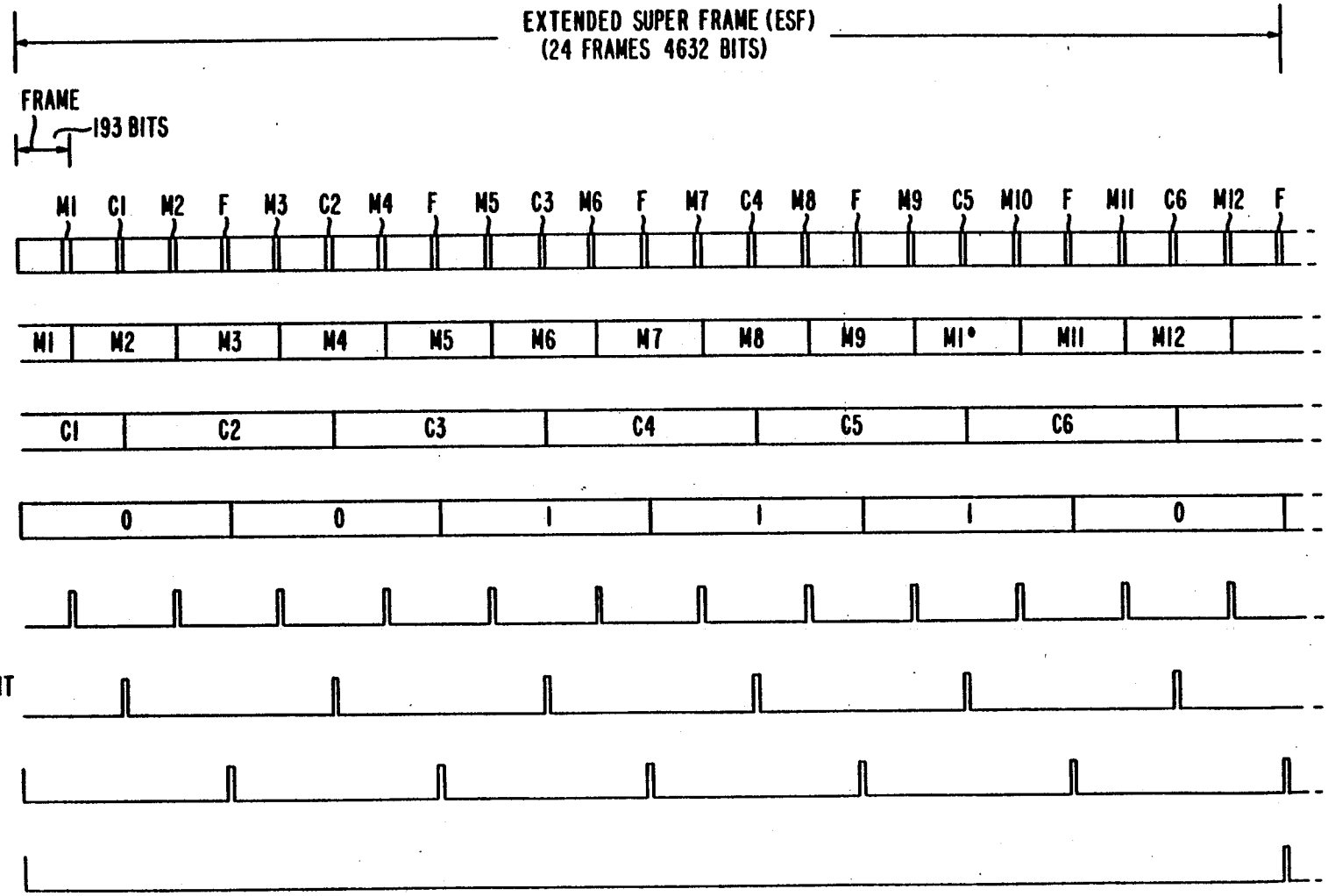
FIG. 4 illustrates a sequence of signals useful in explaining operation of an embodiment of the invention.

Framing pattern bits and timing generator 306 (hereinafter referred to as CLOCK) is responsive to a bit clock signal supplied via terminal 307 for generating framing pattern bits (F-Pat Bits) in a pattern as shown in Table I above, a data link sync (FDL SYNC) signal, CRC-Bit SYNC, framing pattern sync (F-Pat SYNC), and extended super frame sync (ESF SYNC). The bit clock signal is, for example, the T1 clock having a bit rate of 1,544 megabits per second. These signals and their relationship to the bits in the extended super frame (ESF) of XTDM or RTDM are shown in FIG. 4 to be described below.

Accordingly, to generate the desired XTDM output, a TDM input signal from a time division multiplex circuit (not shown) is supplied via terminal 308 to an input of AND gate 301. FDL SYNC, F-Pat SYNC and CRC-Bit SYNC signals are supplied to inhibit inputs of AND gate 301 for disabling it when FDL data bits, F-Pat Bits and CRC-Bits, respectively, are interleaved into the XTDM signal. An output of AND gate 301 is supplied to an input of OR gate 305. FDL data is supplied via terminal 309 to an input of AND gate 302, FDL SYNC is supplied to another input of AND 302 for enabling it to interleave the FDL data signal into the appropriate bit positions of XTDM. An output of AND gate 302 is supplied to OR gate 305 for this purpose. F-Pat bits and F-Pat SYNC are supplied from CLOCk 306 to first and second inputs, respectively, of AND gate 303. F-Pat SYNC enables AND gate 303 to interleave the framing pattern bits into the appropriate bit positions of XTDM. An output of AND gate 303 is supplied to OR gate 305 for this purpose. Cyclical-redundancy-check code word bits (CRC-Bits) are supplied from CRC bit generator 310 to an input of AND gate 304. CRC-Bit SYNC is supplied from CLOCK 306 to another input of AND gate 304 for enabling it to interleave the CRC-bits, in accordance with an aspect of the invention, into the appropriate bit positions of XTDM. An output of AND gate 306 is supplied to an input of OR gate 305 for this purpose.

Figure 5:
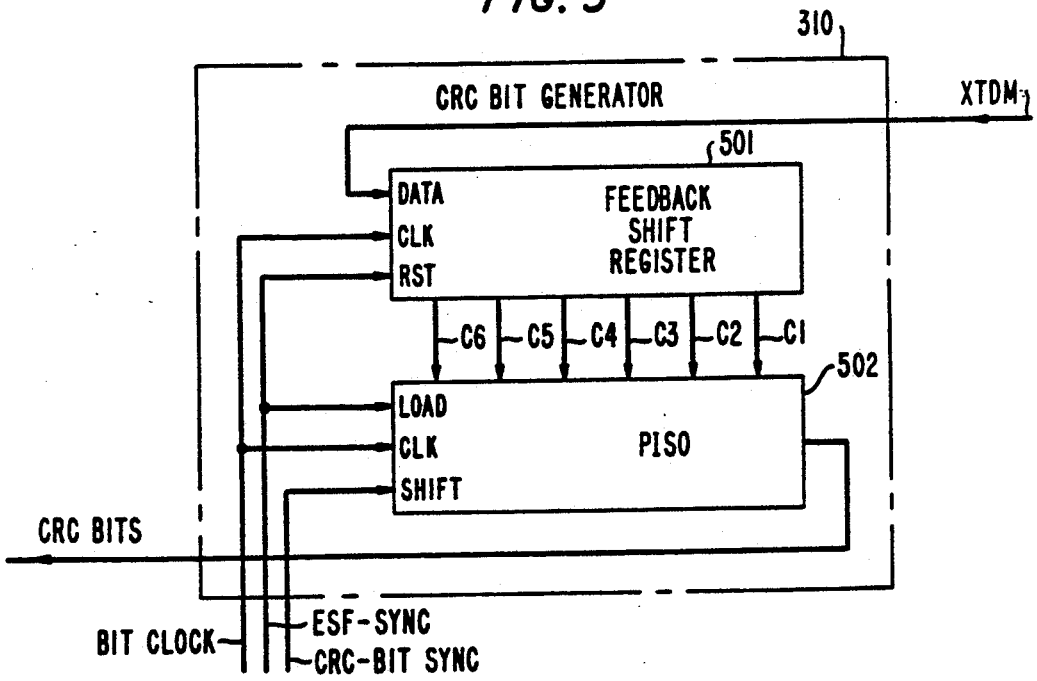
FIG. 5 depicts in simplified form details of the CRC Bit Generator of FIG. 3.
Figure 6:
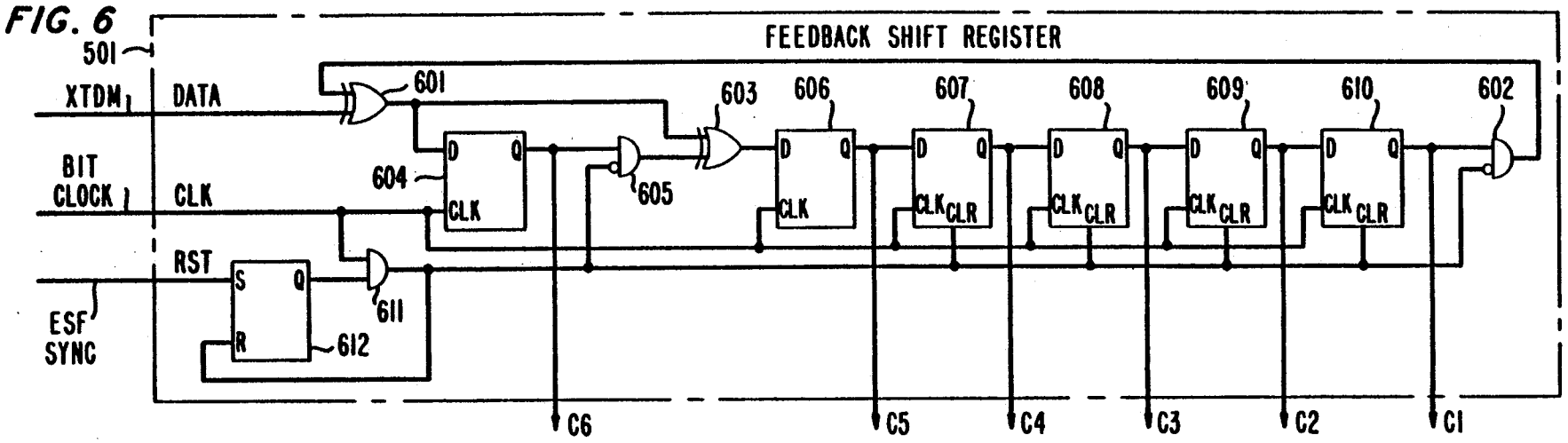
FIG. 6 shows details of the feedback shift register employed in FIG. 5.

CRC bit generator 310 is responsive to XTDM, the bit clock signal supplied from terminal 307, and ESF SYNC and CRC-Bit SYNC signals supplied from CLOCK 306 to generate from the currently transmitted ESF of XTDM a CRC code word having a predetermined number of bits which is to be inserted into predetermined bit positions the next ESF of XTDM to be transmitted. That is to say, a CRC code word is generated, in this example, from the bits of the presently transmitted ESF including the previously inserted CRC bits, which is to be inserted in predetermined ones of the bit positions of the next subsequent ESF to be transmitted. Details of CRC bit generator 310 are shown in FIGS. 5 and 6 and described below. Since, in this example, the bits of the CRC code word are inserted into framing bit positions, no additional data bits are required and overall efficiency of transmission is not reduced. It should also be noted that the CRC bits could be inserted into any of the bit positions in the time division multiplexed signal so long as the positions are predetermined, and that the format is not restricted to the 24 frame ESF.

In this example, a CRC code word having six bits (CRC-6) is employed to realize a desirable confidence level in detecting errors in transmission of bits of the extended super frame. It has been determined that using the simple CRC-6 code which, in accordance with an aspect of the invention, is inserted in predetermined bit positions of the extended super frame (i.e., a block having a predetermined number of bits) approximately 98.4 percent of errors in all of the bits, in this example 4632, are detectable. This is sufficiently adequate for digital transmission performance monitoring although inadequate for error detection in data transmission.

In this example, the CRC-6 code word is generated from the bits of the extended superframe (ESF) being transmitted (XTDM) by employing the cyclic code generator polynomial.

$$x^6+x+1 \qquad (1)$$

An arrangement for realizing equation (1) is shown in FIG. 6 and described below. Cyclic codes are further described in an article by W. W. Peterson and D. T. Brown entitled, "Cyclic Codes for Error Detection", Proceedings of the IRE, January 1961, pages 228–235. See also Chapters 7 and 8 of Error Correcting Codes, The MIT Press, 1972 authored by W. W. Peterson and E. J. Weldon, Jr.

Operation of the transmit circuit of FIG. 3 is best explained by employing the waveforms of FIG. 4. Accordingly, shown in FIG. 4 is one extended super frame (ESF) of XTDM or RTDM. As indicated above, in this example not to be construed as limiting the invention, ESF includes 24 frames each having 193 bits for a block of 4632 bits. Each ESF is initiated by ESF SYNC. TDM input data from a time division multiplex circuit is supplied via terminal 308, AND gate 301 and OR gate 306 to XTDM except when AND gate 301 is inhibited by either FDL SYNC, F-PAT SYNC or CRC-BIT SYNC. FDL data bits M1 through M12 are supplied via AND gate 302 and OR gate 305 to be inserted into framing bit positions 1, 3, 5, 7, 9, 11, 13, 15, 17, 19, 21 and 23, respectively, of XTDM. This is achieved by employing FDL SYNC to enable AND gate 302 to sample the corresponding FDL data bits during the appropriate framing bit positions as shown in FIG. 4. Framing pattern bits generated by clock 306 are supplied into framing bit positions 4, 8, 12, 16, 20 and 24 via AND gate 303 and OR gate 305 in response to F-PAT SYNC pulses enabling AND gate 303 during appropriate framing bit positions as shown in FIG. 4. Similarly, CRC bits generated by CRC bit generator 310 are inserted into framing bit positions 2, 6, 10, 14, 18 and 22 via AND gate 304 and OR gate 305 in response to CRC-BIT SYNC pulses enabling AND gate 304 during the appropriate framing bit positions as shown in FIG. 4. In a receiver the converse operations are performed.

FIG. 5 shows in simplified form details of CRC bit generator 310. Accordingly, shown is feedback shift register 501 which is employed to generate the CRC code word, in this example, in accordance with the generating polynomial of equation (1). XTDM is supplied to the data input of shift register 501 while the BIT CLOCK and ESF SYNC signals are supplied to CLK input and RST input, respectively. Details of one example of a circuit which may be employed for this purpose are shown in FIG. 6. Register 501 generates CRC code word bits C1, C2, C3, C4, C5 and C6 which are supplied in parallel in response to ESF SYNC to parallel in serial out (PISO) shift register 502. ESF SYNC is employed to reset register 501 and load PISO 502. To this end, ESF SYNC is supplied to the load (LD) input of PISO 502. The bit clock signal is supplied to CLK input of PISO 502 and CRC-BIT SYNC is supplied to the shift input of PISO 502. Consequently, the CRC bits are shifted and supplied in series to AND gate 304 at the CRC-BIT SYNC rate. BIT CLOCK is employed to synchronize the pulse transitions.

FIG. 6 shows details of an arrangement which may be employed for feedback shift register 501. This circuit is employed to realize the desired generator polynomial of equation (1) and, therefore, generate bits C1–C6 of the desired CRC-6 code word. To this end, XTDM is supplied via the data input to one input of Exclusive OR gate 601. An output from AND gate 602 which is C1, except when AND gate 602 is inhibited, is supplied to a second input of Exclusive OR gate 601. Consequently, Exclusive OR gate 601 adds the binary output of AND gate 602 to the XTDM bit supplied via the data input. This generates the $1+x^6$ function. An output from Exclusive OR gate 601 is supplied to one input of Exclusive OR gate 603 and D-type flip-flop 604. The Q output of flip-flop 604 is CRC bit C6 supplied to shift register 502 and is also supplied via AND gate 605 to a second input of Exclusive OR gate 603. This is the x function. The output of Exclusive OR gate 603 is the polynomial $x^6+x+1$ and is supplied to D-type flip-flop 606. The output of flip-flop 606 is CRC bit C5 and is supplied to shift register 502 and D-type flip-flop 607. Similarly, the serial connection of D-type flip-flops 607, 608, 609 and 610 generate CRC bits C4, C3, C2 and C1, respectively, all supplied to register 502. The output of flip-flop 610 is the $x^6$ function and is supplied via AND gate 602 to an input of Exclusive OR gate 601. BIT CLOCK is supplied via CLK input to one input of AND gate 611 and to the CLK input of flip-flops 604, 606–610. ESF SYNC is supplied via RST input to the set (S) input of flip-flop 612. The Q output of flip-flop 612 is supplied to a second input of AND gate 611. The output of AND gate 611 is supplied to the reset (R) input of flip-flop 612 and to the clear (CLR) inputs of flip-flops 607–610. AND gate 611 and flip-flop 612 generate a reset pulse to initialize feedback shift register 501 to an all 0 state at the beginning of each extended super frame, i.e., C1–C6 are all 0. AND gates 602 and 605 are used to insure processing of a XTDM bit supplied concurrently with ESF SYNC.

Figure 7:
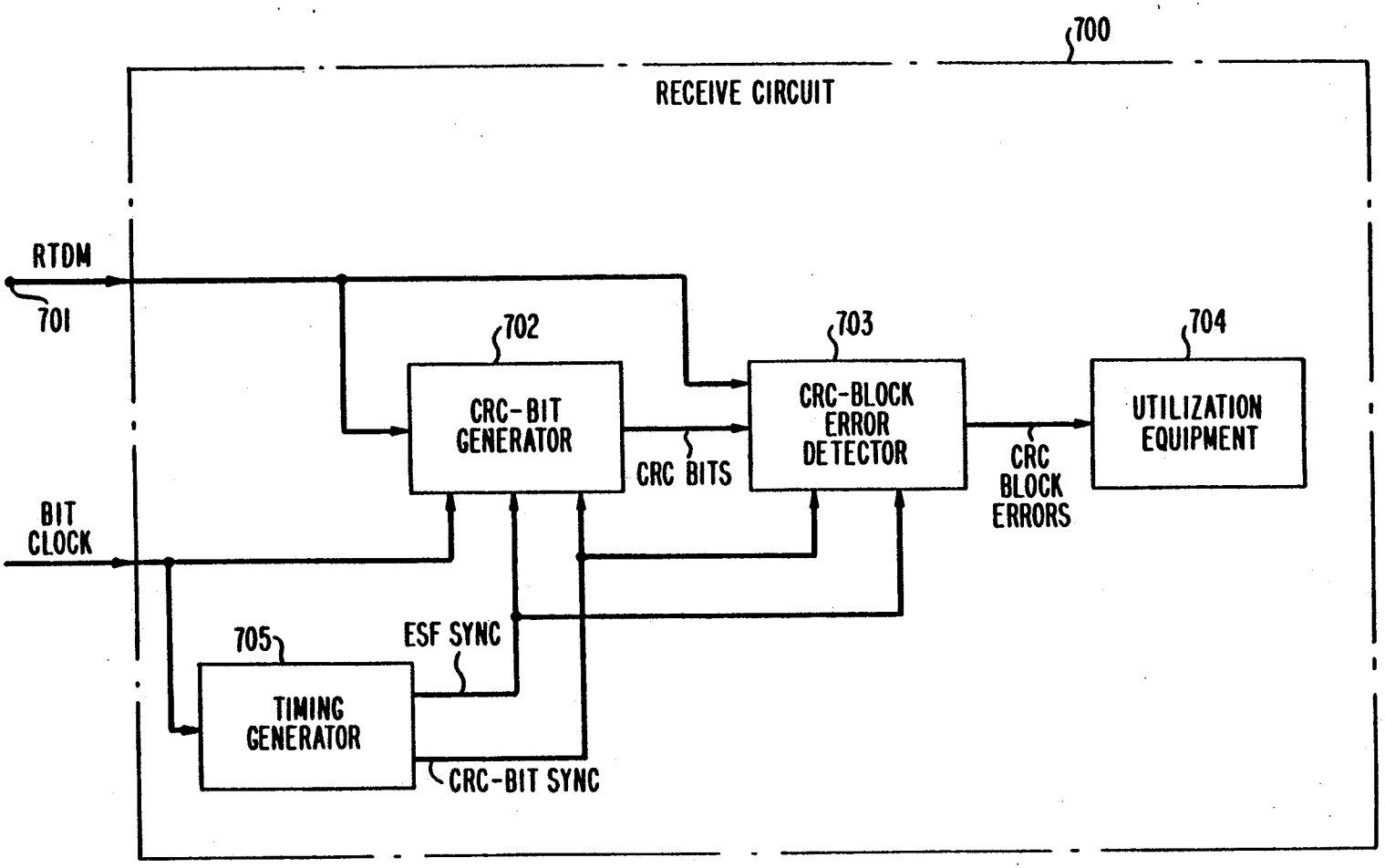
FIG. 7 shows in simplified form a receive circuit employed in the receive unit of FIG. 2.

FIG. 7 shows in simplified form details of receive circuit 700 which is used in receive unit 23 for utilizing the CRC code word bits, in accordance with an aspect of the invention, for detecting errors in a received time division multiplexed (RTDM) signal. Accordingly, received time division multiplexed signal RTDM is supplied via terminal 701 to CRC-bit generator 702 and CRC-block error detector 703. CRC-bit generator 702 is essentially identical to CRC-bit generator 310 employed in transmit circuit 300 and described above. CRC bit generator 702 generates CRC code word bits, in this example, from the presently received extended super frame of RTDM for comparison with the bits of the next received extended super frame of RTDM. CRC bits are serially supplied from CRC generator 702 to CRC-block error detector 703 where they are compared with bits of RTDM. Error indications are supplied from CRC-block error detector 703 to utilization equipment 704. Utilization equipment 704 may be, for example, a microcomputer which uses the individual error indications to monitor performance. For example, specific algorithms may be employed to enable alarms, e.g., major and minor alarms, when prescribed error rates (i.e., errors per number of bits) are exceeded.

Timing generator 705 responds to the bit clock signal which is, for example, the 1.544 megabit per second T1 rate, to generate ESF SYNC and CRC-BIT SYNC. Bit clock, ESF SYNC and CRC-BIT SYNC are supplied to CRC bit generator 702 and are utilized as described above in relation to CRC bit generator 310. ESF SYNC and CRC-BIT SYNC are supplied to CRC-block error detector 703. ESF-SYNC and CRC-BIT SYNC are identical to the signals shown in FIG. 4.

Figure 8:
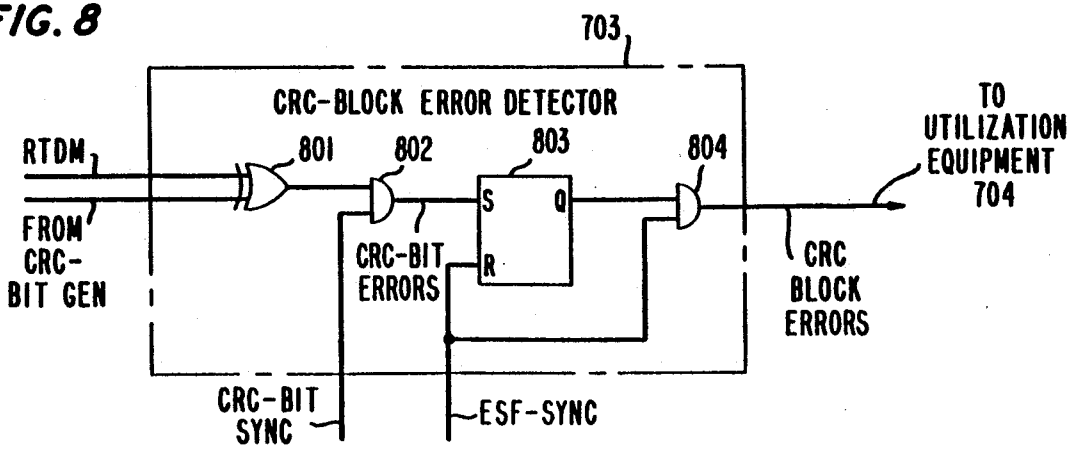
FIG. 8 depicts details of the CRC-Block Error Detector employed in FIG. 7.

FIG. 8 shows details of CRC-bit error detector 703. CRC-block error detector 703 includes Exclusive OR gate 801 which is supplied with the incoming time division multiplex signal RTDM, in this example, the extended super frame (ESF) format and with the CRC bits from CRC bit generator 702. Exclusive OR gate 801 compares the bits in RTDM presently being received with CRC bits generated from the previously received ESF. The output of Exclusive OR gate 801 is supplied to one input of AND gate 802 which is enabled at the CRC bit rate via CRC BIT SYNC. Consequently, the output of Exclusive OR gate 801 is interrogated when a received CRC bit should be present. Since the CRC bits being received and the CRC bits generated by CRC bit generator 702 are ostensively derived from the same signal (i.e., XTDM, RTDM) they should be identical. However, errors may result in transmission because of noise or the like. When the received CRC bit and locally generated CRC bit are not similar Exclusive OR gate 801 generates a logic 1 which is supplied via AND gate 802 to the set (S) input of flip-flop 803. Flip-flop 803 is reset via ESF SYNC being supplied to the reset (R) input. Thus, in this example, one or more CRC-BIT error per extended super frame generate one CRC block error per ESF. Output Q of flip-flop 803 is supplied to one input of AND gate 804. ESF SYNC is supplied to another input of AND gate 804 and, consequently interrogates the Q output of flip-flop 803 upon the occurrence of ESF SYNC. An output of AND gate 804 is the CRC block error indication and is supplied to utilization equipment 704.

What is claimed is:

1. Apparatus for formatting a time division multiplexed signal including a series of blocks of bits, each block including a plurality of data bits and a plurality of additional bit positions, characterized by means (310) responsive to bits in a block of bits of the time division multiplexed signal (XTDM) for generating in accordance with a prescribed criterion a code word (CRC BITS) having a predetermined number of bits less in number than the plurality of additional bit positions; and means (301, 304–306) for inserting said code word bits in predetermined ones of the additional bit positions of a subsequent block of bits of the time division multiplexed signal being transmitted to monitor errors in transmission.

2. Apparatus *including means* for monitoring a received time division multiplexed signal including a series of blocks of bits, each block including a plurality of data bits and a plurality of additional bit positions, characterized by means (702) responsive to all the bits of a block of bits of the received time division multiplexed signal (RTDM) for generating *in* accordance with a prescribed criterion a code word (CRC BITS) having a predetermined number of bits less in number than the plurality of additionsal bit position; and means (703) for comparing said code word bits with bits of a subsequent received block of bits of the time division multiplexed signal to generate error indications.

3. Apparatus for transmitting and receiving time division multiplexed signals including a series of blocks of bits, each block including a plurality of data bits and a plurality of additional bit positions, characterized by means (300) for formatting the time division multiplexed signal (XTDM) including means (310) responsive to bits in a block of bits of the time division multiplexed signal (XTDM) for generating in accordance with a prescribed criterion a code word (CRC BITS) having a predetermined number of bits less in number than the plurality of additional bit positions, and means (301, 304–306) for inserting said code word bits in predetermined ones of the additional bit positions of a subsequent block of bits of the time division multiplexed signal being transmitted to monitor errors in transmission; and means (700) for monitoring a received time division multiplexed signal including means (702) responsive to bits of a block of bits of the received time division multiplexed signal (RTDM) for generating in accordance with a prescribed criterion a code word (CRC BITS) having a predetermined number of bits less in number than the plurality of additional bit positions, and means (703) for comparing said code word bits with bits of a subsequent received block of bits of the time division multiplexed signal to generate error indications.

4. Apparatus as defined in claims 1 or 2, wherein said code word generating means (310; 702) includes means (501) for generating said code word bits (CRC BITS) from a block having a predetermined number of bits of the time division multiplexed signal (XTDM; RTDM) and means for serially supplying said code word bits (502) during a next subsequent block of bits of the time division multiplexed signal.

5. Apparatus as defined in claim 1 or 2, wherein said prescribed criterion includes a predetermined cyclic code generator polynomial.

6. Apparatus as defined in claim 5 wherein said predetermined number of code word bits is six.

7. Apparatus as defined in claim 5 wherein said means for generating said code word from said block of bits includes a feedback shift register (501).

8. Apparatus as defined in claims 1 or 3 wherein said means for inserting includes means (306) for generating a timing signal (CRC BIT SYNC) including pulses concurrent with said code word bits (CRC BITS).

9. Apparatus as defined in claim 8 wherein said code word generating means (301) includes means (501) for generating said code word bits from a block (ESF) having a predetermined number of bits of the time division multiplexed signal (XTDM) and means (502) for serially supplying said code word bits to said means for inserting during a next subsequent block of bits of the time division multiplexed signal.

10. Apparatus as defined in claim 9 wherein said predetermined additional bit positions are predetermined framing bit positions.

11. Apparatus as defined in claim 10 wherein said means for inserting includes means (301, 304) responsive to said timing signal pulses (CRC BIT SYNC) and said code word bits (CRC BITS) for inserting said code word bits in said predetermined framing bit positions.

12. Apparatus as defined in claims 2 or 3 wherein said means for monitoring further includes means (705) for generating a timing signal (CRC BIT SYNC) having pulses concurrent with said code word bits (CRC BITS), wherein said code word generating means (702) includes means for generating said code word bits from a block having a predetermined number of bits of the time division multiplexed signal and means for serially supplying said code word bits during a next subsequent block of bits of the time division multiplexed signal, and wherein said comparing means (703) is responsive to said bits of the received time division multiplexed signal, to said code word bits, and to said timing signal pulses for generating said error indications (CRC BLOCK ERRORS).

13. A method for formatting a time division multiplexed signal including a series of blocks of bits each block including a plurality of data bits and a plurality of additional bit positions, the method comprising the steps of:

generating a code word having a predetermined number of bits less in number than the plurality of additional bit positions from bits in a block of bits of the time division multiplexed signal in accordance with a prescribed criterion; and inserting the code word bits in predetermined ones of the additional bit positions of a subsequent block of bits of the time division multiplexed signal.

14. A method for monitoring errors in a received time division multiplexed signal including a series of blocks of bits each block including a plurality of data bits and a plurality of additional bit positions, the method comprising the steps of:

generating a code word having a predetermined number of bits less in number than the plurality of additional bit positions from bits of a block of bits of the time division multiplexed signal in accordance with a prescribed criterion; and comparing the code word bits with bits of a subsequent received block of bits of the time division multiplexed signal to generate error indications.

*15. Apparatus as defined in claim 2 wherein said means for monitoring further includes means for utilizing said error indications to monitor transmission performance.*

*16. Apparatus as defined in claim 10 wherein said means for monitoring further includes means for utilizing said error indications to monitor transmission performance.*

*17. Apparatus as defined in claim 12 wherein said means for monitoring further includes means for utilizing said error indications to monitor transmission performance.*

*18. Apparatus for transmitting and receiving time division multiplexed signals including a series of blocks of bits, each block including a plurality of data bits and a plurality of additional bit positions,*

*characterized by*

*means (300) for formatting the time division multiplexed signal (XTDM) including means (310) responsive to bits in a block of bits of the time division multiplexed signal (XTDM) for generating in accordance with a prescribed criterion a code word (CRC BITS) having a predetermined number of bits less in number than the plurality of additional bit positions, and means (301, 304–306) for inserting said code word bits in predetermined ones of the additional bit positions of a subsequent block of bits of the time division multiplexed signal being transmitted to monitor errors in transmission; and*

*means (700) for monitoring a received time division multiplexed signal including means (702) responsive to bits of a block of bits of the received time division multiplexed signal (RTDM) for generating in accordance with a prescribed criterion a code word (CRC BITS) having a predetermined number of bits less in number than the plurality of additional bit positions, means (703) for comparing said code word bits with bits of a subsequent received block of bits of the time division multiplexed signal to generate error indications, and means (704) for utilizing said error indications to monitor transmission performance.*

*19. A method for monitoring errors in a received time division multiplexed signal including a series of blocks of bits each block including a plurality of data bits and a plurality of additional bit positions, the method comprising the steps of:*

*generating a code word having a predetermined number of bits less in number than the plurality of additional bit positions from bits of a block of bits of the time division multiplexed signal in accordance with a prescribed criterion,*

*comparing the code word bits with bits of a subsequent received block of bits of the time division multiplexed signal to generate errors indications; and*

*utilizing said error indications to monitor transmission performance.*

* * * * *